UNITED STATES PATENT OFFICE.

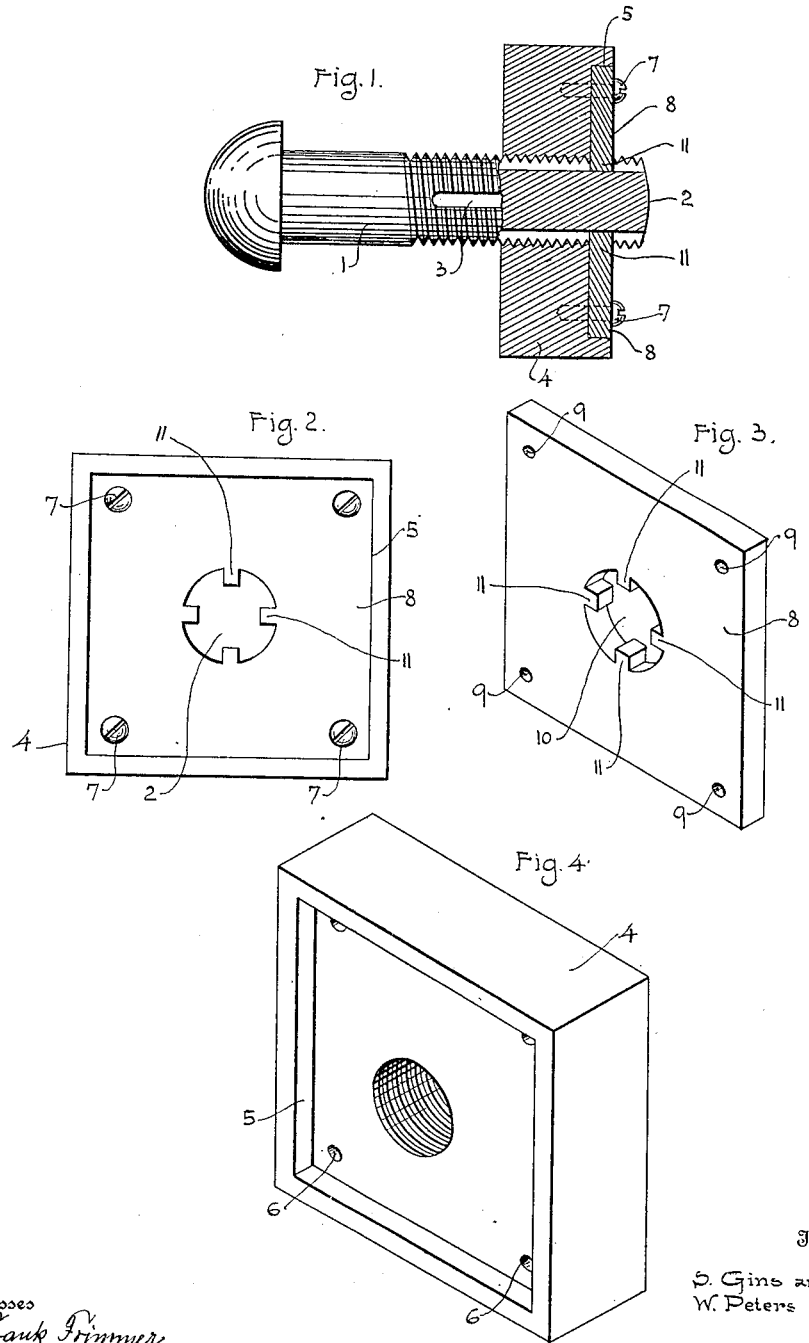

SAMUEL GINS AND WILLIAM PETERS, OF MONESSEN, PENNSYLVANIA.

NUT-LOCK.

No. 926,696.     Specification of Letters Patent.     Patented June 29, 1909.

Original application filed August 18, 1908, Serial No. 449,121. Divided and this application filed February 13, 1909. Serial No. 477,613.

*To all whom it may concern:*

Be it known that we, SAMUEL GINS, a subject of the King of Hungary, and WILLIAM PETERS, a citizen of the United States of America, residing at Monessen, in the county of Westmoreland and State of Pennsylvania, have invented certain new and useful Improvements in Nut-Locks, of which the following is a specification, reference being had therein to the accompanying drawing.

This invention relates to nut locks, and the subject-matter of this application represents a division of our application for patent filed August 18th, 1908, patented Jan. 19th, 1909, No. 910,309.

The present invention has for its object to provide a nut lock of a more simple and durable construction than the nut lock disclosed in the patent above referred to. To this end, we provide a bolt with longitudinal grooves and a nut with a recess for a plate having tongues adapted to engage in the grooves of said bolt and prevent the nut from rotating.

The invention will be hereinafter more fully described and then specifically pointed out in the appended claim.

Referring to the drawings:—Figure 1 is a longitudinal sectional view of our nut lock, Fig. 2 is an end view of the same, Fig. 3 is a perspective view of a detached locking plate, and Fig. 4 is a similar view of a detached nut.

In the accompanying drawings, 1 designates a bolt having the periphery of the threaded end 2 thereof provided with longitudinal equally spaced grooves 3, said grooves being approximately one-half the length of the bolt 1. Adapted to screw upon the threaded end 2 of the bolt 1 is a nut 4 having the outer face thereof provided with a rectangular recess 5 and with screw sockets 6. Detachably mounted in the recess 5 by screws 7 entering the socket 6 is a rectangular plate 8 having screw openings 9. The plate 8 is provided with a central opening 10 and with inwardly projecting equally spaced lugs 11, said lugs being designed to engage in the grooves 3 of the bolt 1, and prevent the nut 4 from rotating, when said nut is mounted upon the bolt 1 and the plate 8 within the recess 5. The lugs 11 are located on the nut 4 directly opposite the center of the four sides thereof. This arrangement throws the strain on said lugs out of line with the strain on the holding screws 7 which are located in the corners of the recess. It will be observed that after the nut 4 has been screwed upon the bolt 1 that the plate 8 can be readily slipped upon the bolt into the recess 5 of the nut, and when secured therein by the screws 7, the nut will be prevented from rotating upon the bolt.

We reserve the right to use our nut lock in connection with rail joints and similar structures, and while in the drawings forming a part of this application there is illustrated the preferred embodiments of our invention, we would have it understood that the detail construction thereof can be varied or changed without departing from the spirit of the invention.

Having now described our invention what we claim as new, is:—

In a nut lock, a bolt having its threaded end formed with four equally-spaced longitudinally-extending grooves square shaped in cross section and a nut threaded on said end having its outer face formed with a recess, a locking plate adapted to fit snugly in the recess of the nut having a centrally-disposed opening through which the threaded end of the bolt is adapted to extend and four equally-spaced square shaped locking lugs projecting toward the center of the opening and located on said plate at points diagonally cutting the axis of the corners of said plate and screws extending through the corners of the plate into the nut so as to hold the plate in the recess and the locking lugs in the grooves of the bolt.

In testimony whereof we affix our signatures in the presence of two witnesses.

SAMUEL GINS.
               WILLIAM PETERS.

Witnesses:
  ALOIS MUHLA,
  PHILIP BRENNER.